June 19, 1945. W. D. BOOKER 2,378,748
STEAM TRAP
Filed Sept. 6, 1943

Inventor
W. D. Booker
By Gareth G. Maybee
ATTY.

Patented June 19, 1945

2,378,748

UNITED STATES PATENT OFFICE 2,378,748

STEAM TRAP

Walter D. Booker, Pine Falls, Manitoba, Canada

Application September 6, 1943, Serial No. 501,396

4 Claims. (Cl. 137—103)

This invention relates to steam traps, and the object of the invention is to provide a simple, compact and efficient steam trap having a minimum number of parts and having large discharge capacity without wire-drawing. Other features of the invention will be hereinafter set forth.

Figure 1:
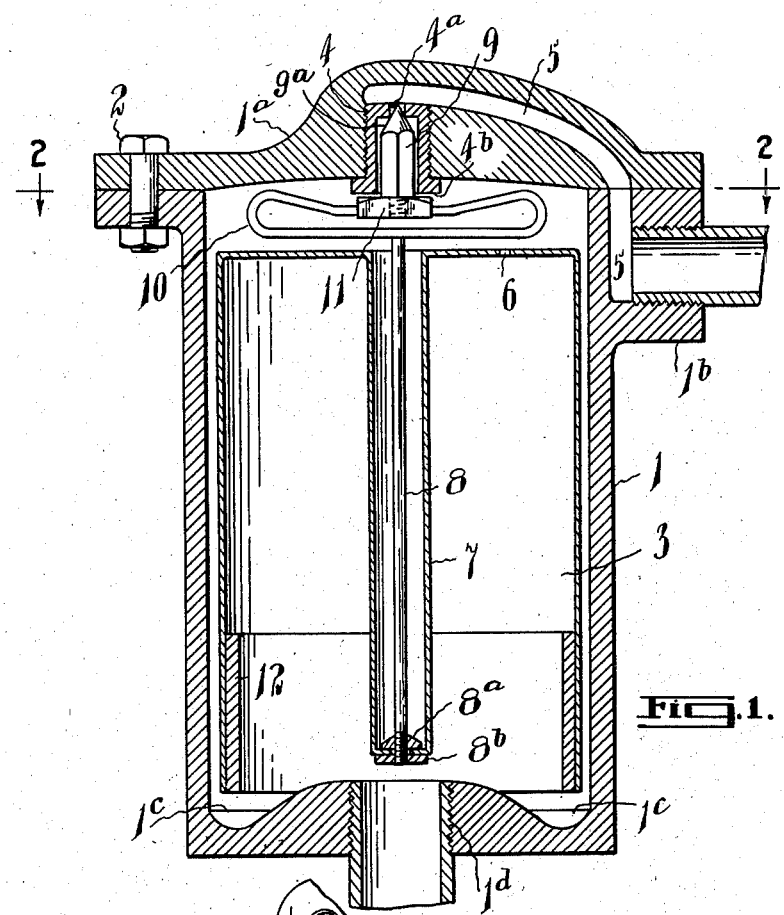
Figure 2:
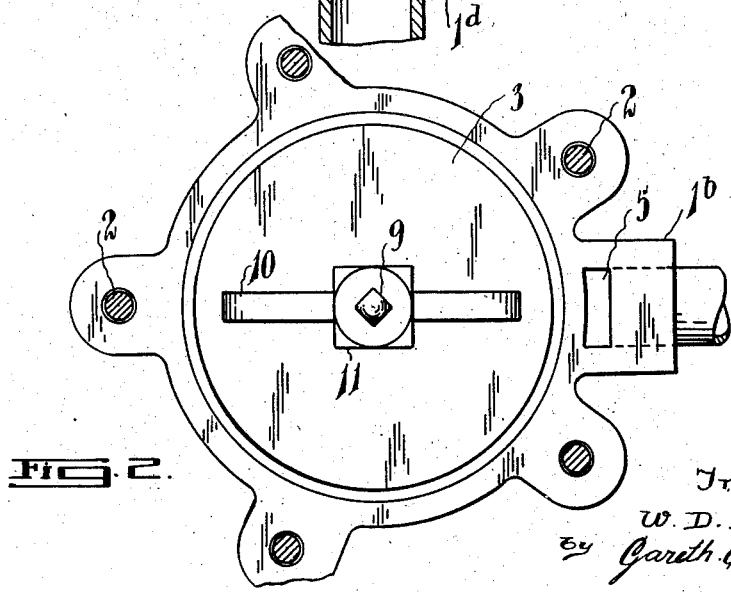

I attain my object by so mounting a valve on a float that the valve will automatically center itself and will be moved quickly into and out of engagement with its seat. The use of closely fitting guides and valve operating linkage has been eliminated. The details of the invention are hereinafter described and are illustrated, by way of example, in the accompanying drawing; in which Figure 1 is a vertical section of my trap; and Figure 2 is a horizontal section on the line 2—2 in Figure 1 showing the valve in plan view.

In the drawing corresponding numbers in the different figures refer to corresponding parts.

The trap comprises a casing 1 having a top or closure 1a secured thereto by bolts 2 extending through suitably arranged lugs. The interior of the casing forms a substantially cylindrical float chamber in which is mounted an inverted bucket type float 3.

In the base or bottom of the casing 1 beneath the float 3 is an internally threaded inlet 1d adapted to be threaded on to a steam pipe. In the head 1a is an outlet likewise internally threaded to receive an externally threaded fitting 4 which is threaded into said outlet and has a restricted opening or orifice 4a formed in the upper or outer end thereof and a flange 4b formed on the inner or lower end thereof adapted to engage the underside of the head 1a.

Extending through the head 1a is an outlet passage 5 which communicates with the orifice 4a and with an internally threaded outlet formed in a boss 1b in the side of the casing 1, the passage 5 being partly in the head 1a and partly in the main part of the casing 1.

The inverted float 3 is closed at the top and open at the bottom, and is provided with a small aperture 6 to permit escape of trapped air. Centrally of the said float and extending downwardly to a point adjacent the bottom thereof is a tube 7 which opens at the top thereof into the float chamber and at the bottom thereof is closed. A flexible rod 8 extends through and substantially centrally of the said tube 7 and is secured to the bottom thereof in any suitable manner, as for instance by passing through a hole in the bottom of the tube 7 and being secured thereto by means of nuts 8a and 8b. This rod 8 is formed of spring wire and forms part of the stem of the valve 9 which fits loosely in the main passage of the fitting 4, and which is square or multi-sided in cross section, providing a space between it and the walls of the fitting, which is circular in cross section. A conical end 9a on the valve is adapted to be seated on a seat formed at the inner or lower end of the orifice 4a.

Interposed between the rod 8 and the valve 9 is a spring 10 made of non-corrosive metal. The spring 10 is preferably in the form of a double loop, which is brazed or otherwise secured to the upper end of the flexible rod 8. The spring carries a nut 11 which may be brazed to the adjacent ends of the looped spring at the top thereof. The lower end of the valve is threaded into the nut so that the valve may be readily renewed.

A suitable weight 12 is secured or formed on the bottom of the float 3, to make the complete float nearly the same weight as the water it displaces. For instance, if the float has a displacement equal to 6½ lbs. of water, the float should weigh about 6 lbs. This would provide a ½ lb. lift to close the valve and would provide a 6 lbs. weight to open the valve. Different size valve orifices 4a may be provided, smaller orifices being used for higher pressures and vice versa.

In the base of the casing 1 are provided a number of raised portions or ridges 1c on which the float rests when it drops permitting the passage of steam and water beneath the float.

In operation, the water of condensation flows through the inlet 1d into the casing 1 and rises in the float 3. Upon the entrance of steam into the float, the latter becomes buoyant and rises to cause the orifice 4a to be closed. On the ascension of the float 3, the flexible rod 8 permits the conical end of the valve 9 to center itself automatically on its seat at the lower end of the orifice. When the valve enters the orifice and partially closes it, then pressure builds up on the back of the valve and forces it closed with a snap action, because the valve moves ahead of the float by reason of its resilient connection with the float putting the spring 10 under tension. The float which possesses considerable inertia by reason of its weight, will then follow the valve putting the spring connection under compression. With this construction, the flexible rod 8 permits vibration of the float laterally without rocking the valve 9 on its seat and the spring 10 permits a limited vibration of the float axially without dislodging the valve from its seat. From this it will be noted that the valve 9 is not only closed quickly and tightly when steam enters the trap, but is prevented from becoming accidentally unseated. Thus wire-drawing or "spitting", which would occur if the valve bounced around on its seat, is eliminated.

When the steam or a portion of it trapped in the float 3 has condensed to such extent that the float is no longer buoyant, the float drops on to the ridges 1c. As condensate collects in the float and the float loses buoyancy and starts to drop, the spring is placed in tension and the valve leaves its seat when the tension exceeds the holding force of the steam pressure on the valve. Once the valve leaves its seat the steam and condensate can pass through the orifice and therefore the holding force decreases rapidly and the spring tension opens the valve quickly to permit the escape of the condensate through the orifice 4a and the outlet passage 5.

By employing a long flexible rod 8, the valve 9 and float 3 will freely move to a greater extent laterally relative to one another. Thus any lateral shifting of the valve to center itself will not tend to correspondingly shift the float to rub against the side of its chamber during the rising of the float, and any lateral movement of the float, when the valve is seated, will not be imparted to the valve.

It will be noted that no closely fitting guides or valve operating linkage is employed.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

What I claim as my invention is:

1. A steam trap comprising a casing having an inlet and an outlet; a valve for controlling said outlet; a seat in the outlet for the valve; a float in the casing; a flexible rod having one end secured to the float; and resilient means interposed between the valve and the other end of the rod so that the valve and float may move laterally or axially, within predetermined limits, relative to one another.

2. A steam trap comprising a casing having an inlet and an outlet; a valve for controlling said outlet; a seat in the outlet for the valve; a float in the casing; a flexible rod having one end secured to the float; and spring means connected with the other end of the rod and carrying the valve to cause it to be quickly engaged with and disengaged from the seat and to permit a limited axial movement of the float relative to the valve without unseating the valve.

3. A steam trap comprising a casing having an inlet and an outlet; a fitting in the outlet provided with a passage and an orifice in communication with one another and with the interior of the casing, the orifice having a seat at the end thereof adjacent said passage; a valve loosely received in said passage and adapted to be seated on said seat to close the outlet; an inverted float having a tubular portion depending from the top thereof, the said portion being open at the top and closed at the bottom; a flexible rod secured at one end to said bottom and extending upwardly through the tubular portion; and spring means connected with the other end of the rod and carrying the valve.

4. A steam trap comprising a casing having an inlet and an outlet; a valve for controlling said outlet; a seat in the casing for the valve; a float in the casing; and means interposed between said float and valve to permit limited lateral and axial movement of the valve and float relative to one another, said means comprising a flexible rod and a spring.

WALTER D. BOOKER.